Figure 1:
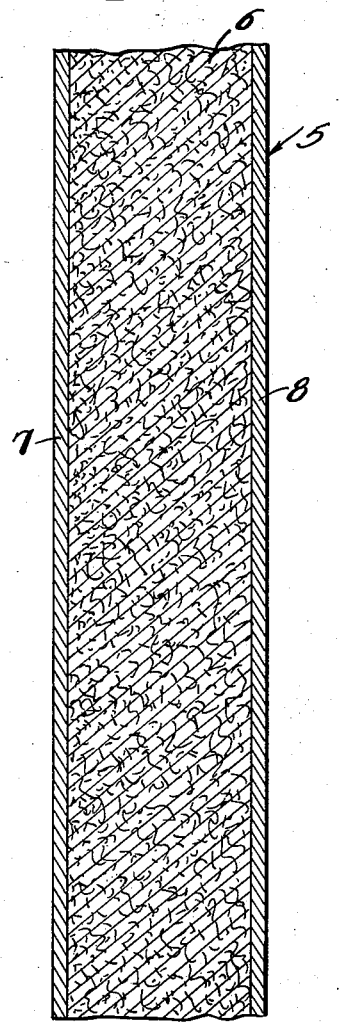

Oct. 17, 1950

M. CROCE 2,526,066

PLASTIC COMPOSITION MATERIALS
AND PRODUCTS MADE THEREFROM
Original Filed Nov. 15, 1943

Inventor:-
Michele Croce,
By William H. DeBusk,
Attorney.

Patented Oct. 17, 1950

2,526,066

UNITED STATES PATENT OFFICE 2,526,066

PLASTIC COMPOSITION MATERIALS AND PRODUCTS MADE THEREFROM

Michele Croce, Evanston, Ill., assignor to Certain-Teed Products Corporation, Chicago, Ill., a corporation of Maryland Continuation of application Serial No. 510,365, November 15, 1943. This application August 7, 1946, Serial No. 688,843. In Canada September 8, 1944

5 Claims. (Cl. 106—110)

This invention relates to plastic composition mixtures and products, and it has for its object the provision of a new and improved form of material by which highly advantageous results shall be attained in connection with building materials embodying the invention. The invention relates particularly to the provision of an improved form of plastic composition by the use of which greatly improved protection against fire shall be obtained.

When a layer of plaster such as the core of an ordinary gypsum wallboard forming the facing portion of a building wall is attacked by a destructive fire, the heat in due time causes the plaster to contract in volume so as to produce cracks in the plaster, with a tendency for the plaster to break up and fall off the wall. My invention has for one of its objects to provide an improved form of composition material for forming the plaster for use in the core of a wallboard, in one embodiment, or for application by any approved plastering method for the formation of a wall, in an alternative embodiment, so that by the use of such improved form of composition material a layer of dried plaster formed therefrom shall be afforded greatly increased resistance to the tendency for cracks to open up in the layer when it is subjected to heat. To this end, it is one of the objects of the invention to provide an improved composition of materials for a plaster either for the formation of a wallboard or for the production of a plastered wall, comprising a non-combustible ingredient such as comminuted raw vermiculite in unexpanded form thoroughly distributed through a layer of dried plaster made from the composition and adapted under the influence of heat when the layer of plaster is attacked by a fire to expand so as to compensate for the contraction of the gypsum or other ingredients of the dried plaster and thus protect the layer of plaster against distortion and maintain it intact to act as a barrier for preventing progress of the fire.

It is another object of my invention to provide, in a composition for making plaster of this type, means adapted to hold adjacent portions of the dried plaster together so as to minimize the disrupting effect produced by the contraction of one particle or the expansion of an adjacent particle under the influence of heat. For this purpose, I have employed non-combustible fibrous material distributed throughout the composition, and I have found that a fairly small amount of such non-combustible fibrous material is effective for attaining the desired results.

Figure 2:
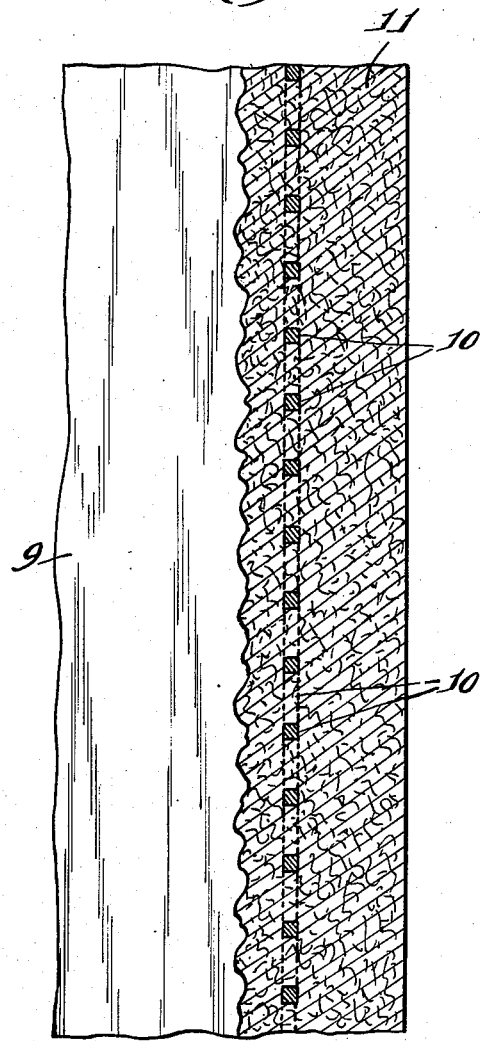

It is another object of my invention to improve compositions and products of this type in sundry details hereinafter pointed out. The two preferred embodiments of the invention are shown in the accompanying drawing, in which:

Fig. 1 is a vertical cross-sectional view through a piece of wallboard embodying my invention; and Fig. 2 is a vertical cross-sectional view through a portion of a wall plastered at one face with my improved plaster.

This application is being filed as a continuation of my earlier application Serial No. 510,365, filed on November 15, 1943, which earlier application became abandoned on September 30, 1947.

In Fig. 1 of the drawing, a wallboard 5, one-half inch thick is shown, comprising a set and dried body portion 6 formed of my improved composition as hereinafter described, such composition having calcined gypsum as its principal ingredient, with paper liners 7 and 8 bonded to opposite faces of the body portion.

In Fig. 2, I have shown my improved plaster in dried condition on a wall comprising studdings 9, with metal lath 10 secured thereon so as to carry a plaster facing portion 11 formed of my improved composition and applied in any suitable manner and dried in position on the lath. This plaster facing 11 as illustrated is formed with comparatively little or no sand and expands only slightly if at all under the influence of heat except for the expansion of the vermiculite content by exfoliation.

In the preferred embodiment of my invention, as embodied either in the wallboard panel of Fig. 1 or the stationary panel of Fig. 2, the composition which with water makes up the body portion 6 of the wallboard 5 as shown in Fig. 1 and the plaster facing 11 of the wall as shown in Fig. 2, comprises about 2% by weight of fibrous material, from about 2½% to 7½% of minus 28 mesh commercial grading raw or unexpanded vermiculite such as that obtained from the Libby, Montana, mine of the Universal Zonolite Company, and the balance largely calcined gypsum. The usual small amounts of additives, such as starch, fine sawdust, accelerator, foam, etc., may be included.

I have found that highly useful results are attained by the use of the following proportions of the dry ingredients as specified.

Table No. I

|  | No. 1 | No. 2 | No. 3 | No. 4 |
|---|---|---|---|---|
|  | Per cent | Per cent | Per cent | Per cent |
| Calcined Gypsum; commercial grade | 95 | 93 | 90.5 | 94.5 |
| Glass wool | 1 | 1 | 1 | None |
| Asbestos fibres | 1 | 1 | 1 | 2 |
| Minus 28 mesh unexpanded vermiculite | 3 | 5 | 7.5 | 3.5 |

Substantial amounts of wallboard of one-half inch nominal thickness have been made up with body portions comprising respectively the ingredients of the four mixtures set forth in this Table No. I, mixed with water in the usual manner, formed between the usual paper liners bonded thereto, and dried, the usual amount of starch adhesive to obtain bond of paper to core and a small volume of soap foam or lather to reduce weight being incorporated in the wet plaster mixture. I have found that such board can be made up readily on a conventional board machine equipped with suitable material-feeding means and can be dried in the ordinary kilns without danger that expansion of the vermiculite will be effected by the drying operation, the comminuted raw vermiculite going through the board machine and the drier without any complications, the same as sawdust or other fillers in use heretofore. A series of fire tests have been carried out at the Underwriters Laboratories, Chicago, Illinois, on 2" x 4" wood stud load-bearing partitions faced with these half-inch boards produced by the use of my improved mixtures, said fire tests being conducted according to Standard Methods of Fire Tests of Building Construction and Materials, A. S. T. M. designation C19-41. The fire tests of my improved boards in comparison with similar tests of ordinary high-grade half-inch boards not embodying my improvements, show for the improved boards substantially improved results, demonstrating that 2" x 4" wood stud load-bearing partitions faced with the boards employing the mixtures as shown in the table and including the raw, unexpanded vermiculite as specified in the table are entitled to fire endurance ratings of from 45 to 51 minutes, as compared with a fire endurance rating of from 35 to 40 minutes for 2" x 4" wood stud load-bearing partitions faced with ordinary high-grade half-inch board in which no expansible mineral of the vermiculite group is present. This is, of course, of utmost importance commercially for enabling the manufacturer to meet the requirements for fire resistance walls.

In the above-mentioned fire tests of my improved boards, the contraction of the gypsum content brought about by the influence of the heat applied to the faces of the partitions was accompanied by an expansion of the raw vermiculite by exfoliation which compensated for and offset the contraction of the gypsum. In these fire tests, the expansion of the vermiculite and the contraction of the gypsum in the board took place at so nearly the same time that there was little or no tendency for the board to crack or open up due to shrinkage. At the same time, any tendency for displacement or disarrangement of the particles of the body material of the boards by reason of the contraction and expansion of the different ingredients was opposed by the mechanical bonding or matting effect of the particles of non-combustible fibrous material distributed throughout the mixture. The result was that the board, with the fibre and unexpanded vermiculite distributed thoroughly through the gypsum, was prevented from disrupting and disintegrating and was enabled to hold its form intact without serious cracks or breaks for a considerably longer period than can be expected in similar fire tests of boards from which the unexpanded vermiculite and the fibre have been omitted.

When raw or unexpanded vermiculite is incorporated into a wallboard or into a layer of plaster on a wall, it does not begin to expand by exfoliation until the temperature reaches a point in excess of 500° F. Since the temperature of 500° F. is well in excess of any temperature to which any of the ingredients of a wallboard are normally raised during the formation and the drying of the board, it will be appreciated that the vermiculite content of such board will normally be maintained in its unexpanded condition up to the time when the board is attacked by a destructive fire. Studies made by authoritative sources have shown that fires of normal severity develop temperatures of 1000° F. in about five minutes. The heat developed in a building fire attacking a wall embodying my improvements, therefore, is normally sufficient for bringing about substantial expansion of the raw vermiculite contained in the wallboard or other layer of plaster forming the facing of the wall, such expansion of the vermiculite taking place in the layer of plaster at the same time when the contraction of the gypsum is being effected and before the heat has been built up to the point where the complete destruction of the layer of plaster takes place. The destruction of the layer of plaster is thus delayed substantially, the resistance to the progress of the fire being thus substantially increased.

I have found satisfactory results in the use of high-grade vermiculite such as that found in the Libby, Montana, deposit, and prefer to employ such mineral, but I do not desire to limit the invention thereto, except as it may be specifically claimed, since there are other minerals of the vermiculite group which can be used to advantage, such as jefferisite, kerrite and philadelphite. It will be understood that any of these minerals may be used effectively in a board, provided such mineral, when used within proper limits as to the amount employed, and when ground to the proper fineness for mixture with the other ingredients, is found to expand sufficiently in a fire to offset to a large extent at least the contraction of the gypsum or other body material of the board.

The amount of the expansible mineral to be employed is preferably controlled by reference to its capacity to expand. As will be readily understood by those skilled in the use of the vermiculite group of minerals, there is a substantial variation in the expansiveness of vermiculite from different mines and even a substantial variation in the expansiveness of different batches of the mineral taken from different parts of the same mine. In the use of this type of material, accordingly, in the manufacture of plaster or wallboard or in any case where the capacity to expand by exfoliation when heated is important, a more or less continuous check should be made as to the effectiveness of the mineral for expanding, the amount of the mineral used being changed preferably from time to time for maintaining the desired total amount of expansion. Generally speaking, when it has been determined that a particular lot of vermiculite is adapted to expand only one half or one third as much as a different lot, it will be found necessary to use twice as much or three times as much of the less expansible mineral for obtaining the same results with respect to expansion.

As showing the variation in the volume expansion of different samples of vermiculite from the same mine, three specimens of Libby, Montana, vermiculite, all ground so as to pass through a 35 mesh screen and to be retained on a 48 mesh screen, showed different percentages of expansion under similar conditions. For one specimen the percentage of volume expansion by exfoliation when heated was 320%, for a second specimen 391%, and for the third specimen 367%, which is typical of the differences to be expected.

As showing the variation in the expansion of specimens of vermiculite from different mines, three specimens of Libby, Montana, vermiculite showed an average expansion of about 359%, as above specified, while three specimens of Encampment, Wyoming, vermiculite under similar conditions as to fineness of grind and other factors of treatment, showed an average expansion of about 161%. A similar sample from a South Carolina mine expanded 298%.

With respect to the fineness of the grind, or particle size, of the vermiculite type of mineral used, I have found that the percent expansion when heated decreases as the average particle size is decreased. This is demonstrated in Table No. II which shows the variation in expansion under high heat of several screen sizes of raw Libby, Montana, vermiculite, based on three samples of each classification of the mineral.

*Table No. II*

| Particle Size | Per Cent Expansion | | |
|---|---|---|---|
| | No. 1 | No. 2 | No. 3 |
| Passing through 35 mesh and retained on 48 mesh | 367 | 391 | 320 |
| Passing through 48 mesh and retained on 60 mesh | 292 | 362 | 250 |
| Passing through 60 mesh and retained on 100 mesh | 250 | 294 | 250 |
| Passing through 100 mesh and including fines | 161 | 193 | 163 |

In the development of the data above set forth, 3 c. c. of the vermiculite were in each instance measured in a graduated glass centrifugal cylinder of 15 c. c. capacity, and then transferred to a porcelain crucible of about 17½ c. c. capacity. The crucible and contents were then placed in the full heat of a Meker C type gas burner using the medium orifice and heated for one minute, after which the contents were stirred for 15 seconds by means of a small steel rod while the heating was continued. The heat was then applied for an additional 3¾ minutes, after which the vermiculite was cooled and then returned to the graduated centrifugal cylinder. In each case the volume of material was read after tapping the bottom of the cylinder on a laboratory bench three times by dropping the cylinder from a height of one inch for settling the particles.

By the use of my invention for the production of wallboard, a gypsum board of normal appearance and having substantially the same physical properties as other high-grade products of the same type, and having the mineral of the vermiculite group and the small amount of fibre mixed thoroughly throughout the body material, may be made on the usual board machine provided with the necessary material feeding equipment. The expansible mineral is not expensive, and the operation of grinding the mineral and otherwise preparing it for use is not difficult. The mineral so employed in its raw, unexpanded condition co-operates with the remaining ingredients of the body material for giving the board the desired normal characteristics. When, however, the board is subjected to the heat of a destructive fire, the mineral expands in situ for offsetting the contraction of the other body material ingredients and thus substantially preserves the form, the size, and the shape of the board with a minimum of distortion so as to lengthen substantially the period preceding the complete breakdown of the board structure. After the vermiculite has expanded, it is a good heat insulating material and increases the resistance of the board to the passage of heat in proportion to the amount added. I have found that where an excess of the vermiculite is employed beyond that necessary for offsetting the contraction of the gypsum or other body material of the board, the thickness of the board core or plaster layer is increased somewhat by reason of the expansion of the vermiculite under the influence of the heat of the fire, serving thus to afford increased insulation against the passage of the heat through the board or plaster. If this excess of vermiculite is fairly small, the increased insulation effect may be had without any radical increase in the tendency of the board or plaster to go to pieces as the heat of the fire builds up.

Seven fire tests have been made on 2" x 4" wood stud partitions faced with my improved ½" gypsum board of six different formulations containing raw vermiculite and non-combustible fibre in comparison with a partition faced with regular ½" gypsum board. In all such fire tests, the partitions using the improved gypsum board including the vermiculite and the fibre gave greater fire protection than the partition using the ordinary gypsum board. To show the effect of various amounts of raw vermiculite in these core materials, gypsum boards of nominal half-inch thickness of various formulations were produced and samples cut from such boards were heated in a furnace to 1400° F. for a period of 30 minutes in each instance to thoroughly calcine the gypsum and to expand the vermiculite. The thickness of the core was measured before and after heating and the change in thickness due to the heating of the boards was determined with results as shown in Table III, allowance being made for the thickness of the paper in the measurements before heating. The percentages of fibre and raw vermiculite shown in the table are the percentages by weight of the total weight of dry ingredients used in making the slurry from which the board core was formed. The vermiculite used was all of the same quality.

*Table No. III*

| Board No. | Mineral Fibre | Raw Vermiculite | Change in Thickness | |
|---|---|---|---|---|
| | | | Inches | Percent |
| | Per cent | | | |
| 1 | 2 | 3½% of minus 28 mesh | minus 0.006 | minus 1.3. |
| 2 | 2 | 5% of minus 28 mesh | plus 0.015 | plus 3.34. |
| 3 | 2 | 7½% of minus 28 mesh | plus 0.086 | plus 19.1. |
| 4 | 2 | 5% of minus 35 mesh | minus 0.003 | minus 0.67. |
| 5 | 2 | 7% of minus 35 mesh | plus 0.059 | plus 13.1. |
| 6 | 2 | 10% of minus 35 mesh | plus 0.071 | plus 17.4. |
| 7 | None | None | minus 0.030 | minus 6.7. |

Expansion of the board core or plaster layer when exposed to fire is actually beneficial as regards fire resistance, provided the amount of expansion is not so great as to cause bulging of the board or plaster layer to such degree that it cracks and opens up or falls off in sections. If it remains in place to serve as a barrier to the passage of heat and flame, the increased thermal insulating value resulting from the increased thickness of the expanded board core or plaster layer offers additional resistance to temperature rise on the side opposite the fire.

The increased thermal insulating value resulting from the increased thickness was demonstrated by additional tests. A series of 6" x 6" samples take from the same boards 7, 1, 2 and 3 listed in Table III were placed in a horizontal position at a definite height above a Meker C type gas burner and exposed to the action of the flame under carefully controlled conditions of gas pressure. The time required for the paper on the top (unexposed) side of each sample to char was recorded. The thickness of the core before and after heating was also measured and the change in thickness was recorded. Results are shown in Table IV.

*Table No. IV*

| Board No. | Change in Thickness | Time required to char paper on top side |
| --- | --- | --- |
|  | *Inches* | *Minutes* |
| 7 | minus 0.020 | 13½ |
| 1 | minus 0.006 | 16½ |
| 2 | plus 0.034 | 19. |
| 3 | plus 0.072 | plus 30. |

I have had very satisfactory results by the use of Libby, Montana, vermiculite from the mine of the Universal Zonolite Company, using such vermiculite comminuted to either minus 28 mesh commercial grading or minus 35 mesh commercial grading and employing from 3½% to 10% of such vermiculite based on the weight of the mixture.

I have also had very satisfactory results by the use of 2% of fibre, either 2% of asbestos fibre or 1% of asbestos fibre and 1% of glass wool fibre. I have found the asbestos fibre more satisfactory with respect to controlling and feeding the fibre into the mixture.

Results of typical screen tests of the comminuted raw vermiculite as used by me and designated as "minus 28 mesh commercial grading" and "minus 35 mesh commercial grading" are shown as follows:

*Table No. V*

|  | Minus 28 mesh | Minus 35 mesh |
| --- | --- | --- |
|  | *Per cent* | *Per cent* |
| Retained on 28 mesh screen | 0.4 | 0.0 |
| Through 28 mesh and retained on 35 mesh screen | 11.8 | 0.7 |
| Through 35 mesh and retained on 60 mesh screen | 58.2 | 46.0 |
| Through 60 mesh and retained on 100 mesh screen | 20.4 | 30.3 |
| Through 100 mesh screen | 9.2 | 23.0 |
|  | 100.0 | 100.0 |

I have also found that the amount of fibre required depends to a considerable extent upon the length and thickness of the individual fibres and upon their ability to withstand mechanical mixing and handling without excessive reduction in length. With very long, tough fibres, I have found that 1% is sufficient in most cases, while with shorter fibres as much as 5% to 10% may be required. One of the principal functions of the fibre is to prevent spalling of the plaster as the raw vermiculite particles expand when the plaster is exposed to fire. Without any fibre present the plaster spalls and disintegrates as calcination progresses and expansion of the raw vermiculite particles occurs under the influence of heat. Sufficient fibre should be used to prevent such spalling and to bind the calcined board core or other plaster layer together.

In actual practice, I have found that a grade of asbestos designated as 5–R is suitable and economical for the purpose. This asbestos fibre is of medium length and is economical in cost. Results of a typical screen test of this fibre, using a 50 gram sample and 8 inch diameter nested screens shaken on a Ro-tap machine for 15 minutes were as follows:

*Table No. VI*

|  | Per cent |
| --- | --- |
| Retained on 8 mesh | 11.7 |
| Through 8 mesh and retained on 28 mesh | 53.3 |
| Through 28 mesh and retained on 48 mesh | 13.2 |
| Through 48 mesh | 21.8 |
|  | 100.0 |

Longer fibred asbestos is more effective on an equal weight basis, but the cost per pound is also higher.

TWF bulk glass wool manufactured by the Owens Corning Fiberglas Corporation is a satisfactory grade of glass wool for the purpose. Rock wool may be used but it is more difficult to disperse in the mixture and is not as effective as the glass wool on an equal weight basis.

In making the various gypsum boards, containing unexpanded vermiculite and fibre as shown in Table No. III, about 1% bonding starch was used in the core mixture. In making the boards, 100 parts of dry ingredients were mixed with about 90 parts of water to make a moldable slurry to which a sufficient quantity of soap foam or lather was added to produce dry board of one-half inch thickness weighing from 2 to 2.3 lbs. per square foot. The slurry was molded between cover sheets and when the core had set the board was dried in the usual manner in a conventional wall-board drier.

In connection with the form of my improved panel as shown in Fig. 1, the cover sheets of paper function in the same way as they do in connection with the ordinary wallboard, serving to protect the plaster body and to give the product strength during the formation of the board on the board machine and to give the board the desired strength and stiffness in position on a wall. Such cover sheets are not relied upon, however, for affording any protection against fire, since the cover sheet at the face of the board at which the fire attacks is very soon burned away so as to give the fire direct access to the face of the body material of the panel. After the cover sheet is burned away, the plaster slab alone is relied upon to maintain its form without cracks and without warping such as might permit the fire to force its way through the wall.

It will be understood that it is highly important that when my improved plaster panel is attacked by a fire at one face only of the panel, such face of the panel shall be protected effectively against either contracting or expanding. If the attacked face of the board of Fig. 1 contracts greatly as compared with the opposite face of the board, the board will be caused to warp so as to present a concaved face toward the fire. If the attacked face should expand substantially as compared with the opposite face, the board would warp in the opposite direction so as to present a convex face toward the fire. In the event of such warping in either direction, a very strong pressure is applied on the side margins of the board edgewise of the board serving to force such margin portions loose from the securing means by which they are held on their supports, serving thus to open up the joints between adjacent sections of the board and thus to destroy very quickly the effectiveness of the board for stopping the advance of the fire. By the use of my improved plaster board, in which the tendency for the face of the board to contract by reason of the presence of the set gypsum is balanced and counteracted by the tendency for the face of the board to expand by reason of the presence of the vermiculite, substantial protection is afforded against the opening up of cracks in the face of the wall and also against warping of the board such as might break the joints between adjacent panels. The period of time, thus, during which this stiff self-sustained board is effective for protecting against the advance of a fire is very substantially increased.

The use of my invention in connection with a plaster wall as shown in Fig. 2 is of substantially the same importance as in connection with a wallboard. When a fire attacks the face of a wall such as is shown in Fig. 2, in which there are no paper liners employed, any substantial amount of warping of the plaster panel would have a marked tendency to open up cracks between portions of the wall face, so as to permit the fire to advance through such cracks, or so as to cause fragments of the face material to become dislodged as the initial step in a speedy breakdown of the wall as a whole.

When a fire attacks a wall having a face made principally of gypsum without any vermiculite dispersed therethrough so as to cause the face of the board toward the fire to contract, or, alternatively, made principally of gypsum with too great a proportion of vermiculite dispersed therethrough so as to cause the face of the board toward the fire to expand substantially as compared with the opposite face of the board, in either case the face of the wall is broken up into separated pieces so as to destroy the effectiveness of the wall for stopping the advance of a fire long before the separate pieces have been greatly weakened in strength or stiffness, the failure being due to the breaking up of the wall as a whole rather than to the destruction or weakening of the separate pieces of the panel.

My improved gypsum wallboard is comparable in every important respect with other high-grade gypsum wallboards on the market. In the fire tests conducted at Underwriters Laboratories, Chicago, Illinois, according to Standard Methods of Fire Tests of Building Construction and Materials, A. S. T. M. designation C19–41, on wood studded, load bearing partitions faced on each side with one thickness of such board, the partitions received a fire resistance rating of at least 45 minutes in each instance. A minimum fire resistance rating of 45 minutes is required in F. H. A. regulations for certain types of partitions in rental housing projects. Wood studded partitions faced on each side with one layer of regular ½" gypsum board have failed to meet this requirement. It is evident, therefore, that ½" gypsum board having a core made according to my invention serves a definite need and has a definite advantage over conventional ½" board.

When using a lower grade of vermiculite, or some other mineral of the vermiculite group not adapted to have so great expansion as high-grade vermiculite, I would expect to use an increased amount of such lower grade mineral, or would increase the particle size of such low grade mineral, so as to insure that the amount of the expansion of the mineral of the vermiculite group would, when the gypsum board is subjected to heat, approach closely to the amount of expansion which would be obtained with the lesser amounts of high-grade raw vermiculite as specified.

When my improved plaster is to be applied by ordinary wall plastering methods, the proportions of the vermiculite and fibre may be about the same as are specified above in connection with wallboard, or the amount of the vermiculite and fibre may be substantially increased so as to obtain an increased insulating effect. The use of the increased amount of vermiculite and fibre is possible in the plastered wall by reason of the fact that the lath in such wall provides more secure structural support for the plaster.

The mineral of the vermiculite group and the fibre may be mixed with the gypsum or other body material either at the time of manufacture of the plaster or at any other time prior to the application of the cementitious mixture to the wall. Such plaster on the wall may be covered by a white coat of any suitable type as well known in the art, or it may be covered by a special white coat having mineral of the vermiculite group incorporated therewith, and with preferably a small amount of non-combustible fibre as indicated above.

The subject matter of applicant's earlier application, Serial No. 510,365, was covered by an application in Canada, Serial No. 518,157, filed September 8, 1944.

I claim:

1. A plastic composition comprising comminuted calcined gypsum adapted to set when mixed with water, high-grade comminuted vermiculite of about minus 28 mesh commercial grading adapted to expand by exfoliation upon the application of heat thereto and used in an amount in the range between 3½% and 7½% of the weight of the mixture, and non-combustible fibrous material dispersed through the mixture and constituting by weight in the range between 1% and 10% of the composition, the gypsum content in said mixture constituting a quantity sufficient with said mineral and said fibrous material to substantially complete the 100% content of the mixture.

2. A plastic composition mixture comprising comminuted calcined gypsum adapted to set when mixed with water, a mineral of the vermiculite group in comminuted form capable of being expanded by exfoliation by the application of heat thereto, and non-combustible fibrous material dispersed through the mixture and constituting by weight in the range between 1% and 10% of the composition, the degree of comminution of the mineral of the vermiculite group and the grade and amount of such mineral used being such that when the cast made from such mixture is heated to a high temperature the expansible mineral in the cast shall have about the same total amount of expansion as would 3½% to 7½% of high-grade vermiculite of minus 28 mesh commercial grading, the gypsum content in said mixture constituting a quantity sufficient with said mineral and said fibrous material to substantially complete the 100% content of the mixture.

3. A stiff self-sustaining panel adapted for use as the outer structural layer of a wall structure and in the form of a body member comprising about 93% of set calcined gypsum as the major ingredient, about 2% by weight of asbestos fibres; and about 5% by weight of high-grade comminuted vermiculite in its unexpanded form and of a particle size of about minus 28 mesh commercial grading, said fibres and said comminuted mineral being dispersed through the body.

4. A stiff self-sustaining panel adapted for use as the outer structural layer of a wall structure and in the form of a body member comprising set calcined gypsum as the major ingredient, from 1% to 10% by weight of non-combustible fibres dispersed through the body, and about 3½% to 7½% of high-grade comminuted vermiculite in its unexpanded form and of about minus 28 mesh commercial grading dispersed through the body, the gypsum content in said mixture constituting a quantity sufficient with said vermiculite and said fibres to substantially complete the 100% content of the mixture.

5. A stiff self-sustaining panel adapted for use as the outer structural layer of a wall structure and in the form of a body member comprising set calcined gypsum as the major ingredient, from 1 to 10% by weight of non-combustible fibres dispersed through the body, and about 5% to 10% of high-grade comminuted vermiculite in its unexpanded form and of about minus 35 mesh commercial grading dispersed through the body, the gypsum content in said mixture constituting a quantity sufficient with said vermiculite and said fibres to substantially complete the 100% content of the mixture.

MICHELE CROCE.

REFERENCES CITED

The following references are of record in the file of this patent:

UNITED STATES PATENTS

| Number    | Name           | Date          |
|-----------|----------------|---------------|
| 1,702,965 | Haggerty       | Feb. 19, 1929 |
| 1,890,674 | Delaney        | Dec. 13, 1932 |
| 2,009,146 | New            | July 23, 1935 |
| 2,060,295 | Finefrock et al. | Nov. 10, 1936 |
| 2,090,480 | Hawley         | Aug. 17, 1937 |